United States Patent
Geyer (10) Patent No.: US 10,286,786 B2
(45) Date of Patent: May 14, 2019

(54) CHARGING CIRCUIT FOR AN ELECTRICAL ENERGY ACCUMULATOR, ELECTRICAL DRIVE SYSTEM AND METHOD FOR OPERATING A CHARGING CIRCUIT

(71) Applicant: Robert Bosch GmbH, Stuttgart (DE)

(72) Inventor: Hans Geyer, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 170 days.

(21) Appl. No.: 15/516,180

(22) PCT Filed: Aug. 5, 2015

(86) PCT No.: PCT/EP2015/068018
§ 371 (c)(1),
(2) Date: Mar. 31, 2017

(87) PCT Pub. No.: WO2016/050392
PCT Pub. Date: Apr. 7, 2016

(65) Prior Publication Data
US 2017/0305278 A1    Oct. 26, 2017

(30) Foreign Application Priority Data
Oct. 1, 2014   (DE) .................. 10 2014 219 909

(51) Int. Cl.
*H02M 1/10*       (2006.01)
*H02M 7/04*       (2006.01)
(Continued)

(52) U.S. Cl.
CPC ............ *B60L 11/18* (2013.01); *B60L 11/182* (2013.01); *B60L 11/1812* (2013.01);
(Continued)

(58) Field of Classification Search
CPC .. B60L 11/18; B60L 11/1812; B60L 11/1814; B60L 11/1816; B60L 11/182;
(Continued)

(56) References Cited

U.S. PATENT DOCUMENTS

| 2009/0200970 A1 | 8/2009 | Kimura | |
| 2012/0229061 A1* | 9/2012 | Itoh | B60L 3/003 318/400.3 |
| 2013/0106365 A1* | 5/2013 | Ang | B60L 3/0069 320/138 |

FOREIGN PATENT DOCUMENTS

| EP | 0768774 | 4/1997 |
| JP | 2003189636 A | 7/2003 |

(Continued)

OTHER PUBLICATIONS

International Search Report for Application No. PCT/EP2015/068018 dated Oct. 20, 2015 (English Translation, 2 pages).

*Primary Examiner* — Drew A Dunn
*Assistant Examiner* — Sailesh Thapa
(74) *Attorney, Agent, or Firm* — Michael Best & Friedrich LLP (57) ABSTRACT

The present invention relates to a charging circuit for an electrical energy accumulator and a method for operating a charging circuit. Common components are used for charging and discharging the electrical energy accumulator. According to the invention, a charging circuit comprises step-up and step-down functionalities and combines them with rectifier and/or inverter functionalities. In this way, a circuit arrangement is created which allows a flexible circuit design with a small number of components.

10 Claims, 4 Drawing Sheets

(51) Int. Cl.
*B60L 11/18* (2006.01)
*H02M 3/158* (2006.01)
*H02M 7/5387* (2007.01)

(52) U.S. Cl.
CPC ....... *B60L 11/1814* (2013.01); *B60L 11/1816* (2013.01); *H02M 1/10* (2013.01); *H02M 3/1582* (2013.01); *H02M 7/04* (2013.01); *H02M 7/5387* (2013.01); *Y02T 10/7005* (2013.01); *Y02T 10/7072* (2013.01); *Y02T 90/122* (2013.01); *Y02T 90/127* (2013.01); *Y02T 90/14* (2013.01)

(58) Field of Classification Search
CPC ........ H02M 7/04; H02M 3/1582; H02M 1/10; H02M 7/5387; Y02T 90/14; Y02T 90/122; Y02T 90/127; Y02T 10/7072; Y02T 10/7005
See application file for complete search history.

(56) References Cited

FOREIGN PATENT DOCUMENTS

| | | |
|---|---|---|
| JP | 2006149074 A | 6/2006 |
| JP | 2011250656 A | 12/2011 |
| WO | 2012011176 | 1/2012 |
| WO | 2013182064 | 12/2013 |

\* cited by examiner

CHARGING CIRCUIT FOR AN ELECTRICAL ENERGY ACCUMULATOR, ELECTRICAL DRIVE SYSTEM AND METHOD FOR OPERATING A CHARGING CIRCUIT

BACKGROUND OF THE INVENTION

The present invention relates to a charging circuit for an electrical energy storage device, a drive system having a charging circuit, and a method for operating a charging circuit.

Motor vehicles that are completely or at least in part electrically driven such as for example hybrid vehicles and electric vehicles are becoming increasingly more important. The desire for greater driving ranges and capacities of the electrically driven vehicles is also increasing simultaneously. The charging technology for electric vehicles is also becoming increasingly more important in this connection. Present-day electric vehicles typically use conductive charging concepts that represent units that are self-sufficient and spatially separate from the electronic drive system. Furthermore, charging concepts that function in a contact-less and generally inductive manner are also already known. These charging concepts are typically likewise embodied as stand-alone systems.

The European patent application EP 0 768 774 A2 discloses a device for charging batteries in electric vehicles. The electric vehicle comprises an electronic regulation system that has a recovery facility. A DC current source provides a direct current that charges the battery by way of this electronic regulation system so as to charge the battery.

Owing to the increasing battery capacities and the endeavors to achieve ever-reducing charging time periods, it is desirable that the magnitude of energy that is transferred per unit of time in the charging operation is approximately equal to the magnitude of energy that is drawn off from the traction battery during the driving operation or is even greater than the magnitude of said drawn-off energy. This requires that the components that participate in the charging procedure are embodied to cope with the high currents. The electrical energy storage device in an electric vehicle is generally charged by means of the electrical energy that is provided by means of an alternating current supply.

There is therefore a requirement for a cost-effective and efficient charging circuit for an electrical energy storage device for charging the electrical energy storage device from an AC voltage supply.

SUMMARY OF THE INVENTION

For this purpose, the present invention provides a charging circuit for an electrical energy storage device having a DC voltage connection that comprises a first connection element and a second connection element and that is connected to the electrical energy storage device; and an AC voltage connection that comprises a third connection element and a fourth connection element. The charging circuit comprises moreover a first switching element that is arranged between the first connection element and a first junction; a second switching element that is arranged between the first junction and the second connect element; a third switching element that is arranged between the third connection element and a second junction; a fourth switching element that is arranged between the second junction and the fourth connection element; and a first inductance that is arranged between the first junction and the second junction.

Moreover, the charging circuit comprises a charging circuit that is embodied so as in a charging mode to electrically separate the AC voltage connection from an electric machine, and in a driving mode to electrically connect the AC voltage connection to the electric machine.

In accordance with a further aspect, the present invention provides a method whereby a charging circuit in accordance with the invention is operated with the step of electrically coupling an electric machine to the charging circuit in a driving mode; and with the step of electrically separating the electric machine from the charging circuit in a charging mode.

The present invention is based on the knowledge that in each case very expensive and in part large components are required to control the high currents both when charging an electrically energy storage device and also when drawing off electrical energy from the electrical energy storage device for high currents.

The present invention is therefore based on the idea to provide a switching arrangement that can use the same components both for charging an electrical energy storage device and also for controlling the current as electrical energy is drawn off from the energy storage device. In this manner, it is possible to achieve a synergetic double usage of expensive components that can be used both in the charging operation and also while drawing off the electrical energy. For this purpose, the present invention provides a symmetrical, bi-directional buck/boost converter topology that can switch from a charging mode into a driving mode and back by means of a simple switching procedure.

Furthermore, the charging circuit in accordance with the invention combines a bi-directional inverter/rectifier with a buck/boost converter (DC voltage converter). By virtue of using the buck/boost converter functionality, a high degree of flexibility when selecting the input and output voltages is achieved. This opens up numerous options when selecting the input voltage in the charging mode and when selecting the output voltage in the driving mode.

Furthermore, the charging circuit in accordance with the invention renders it possible to achieve a very flexible control procedure so that it is also possible to implement further functions, such as by way of example a power-factor correcting (PFC) function or similar without any additional expenditure with regard to the hardware.

In accordance with one embodiment, the charging switch is moreover embodied so as in the charging mode to connect the AC voltage connection to a voltage source. It is preferred that the voltage source is an AC voltage source. In this manner, it is possible to provide an electrically conductive coupling between the voltage source and the charging circuit so that the charging circuit can be supplied with energy from this voltage source in order to charge the electrical energy storage device. Furthermore, it is possible in the case of such an electrical coupling also to feedback electrical energy from the electrical energy source to the voltage source by way of the charging circuit. It is possible in this manner to achieve in particular an energy feedback concept, for example vehicle-to-grid (V2G).

In accordance with a further embodiment, the first inductance can be coupled to a further inductance. It is possible by virtue of coupling the first inductance to a further inductance to transfer energy in an inductive manner from the further inductance to the first inductance—or also in the reverse direction. In this manner, an inductive charging concept is achieved, wherein the first inductance of the charging circuit is used as the secondary coil and the further inductance is used as the primary coil of a charging station.

Consequently, it is possible to transfer energy in an inductive manner without having to provide for this purpose a separate secondary coil (receiving coil).

In accordance with a further embodiment, the charging circuit comprises moreover a control circuit that is embodied so as to control the first, second, third and fourth switching elements with a predetermined switching frequency. The control circuit can either permanently open or close the individual switching elements or however also control the individual switching elements with a suitable switching frequency in order to convert an input voltage at the AC voltage connection into a charging voltage for charging the electrical energy storage device. Simultaneously, the same charging circuit can also be used for an inverse voltage conversion, wherein the electrical energy is fed back from the electrical energy storage device to the voltage source, by way of example into an energy supply network. Furthermore, it is also possible by virtue of a corresponding control procedure by means of the control device to control an electrical consumer, by way of example an electric drive, by means of the energy that is provided by the electrical energy storage device. Furthermore, additional functionalities can also be achieved by means of correspondingly controlling the switching elements by means of the control device. It is possible in this manner to adjust the functionality of the charging circuit in a flexible manner by means of appropriately controlling the switching elements by means of the control circuit.

In accordance with a further embodiment, the predetermined switching frequency with which the control circuit controls the switching elements is higher than 20 kHz. Such high frequency switching frequencies render it possible to operate the charging circuit at frequencies above the audible frequency spectrum. It is possible in this manner to avoid any disturbing noise emissions. Furthermore, it is possible by virtue of high switching frequencies, in particular switching frequencies of more than 20 kHz to also use smaller components, in particular smaller inductances and where necessary smaller capacities in the charging circuit. Thus, it is possible by virtue of increasing the switching frequency to also scale the further components, in particular the inductances and capacitances. The volume and the weight of the charging circuit can be reduced in this manner. Furthermore, it is possibly by virtue of smaller components to also reduce the costs for the construction of the charging circuit.

In accordance with a further embodiment, the first, second, third and fourth switching elements comprise silicon carbide (SiC) switching elements or super junction MOSFETs. Such switching elements are particularly suitable for high switching frequencies, in particular switching frequencies of more than 20 kHz and also comprise relatively low losses even in the case of these high switching frequencies.

In accordance with a further aspect, the present invention provides a charging device having a plurality of charging circuits in accordance with the invention, an electrical energy storage device that is connected to the DC voltage connections of the charging circuits; and a multi-phase AC voltage source, wherein each phase of the AC voltage source is electrically coupled to an AC voltage connection of the charging circuit. In particular, all DC voltage connections of the multiple charging circuits are also electrically coupled to one another and thus connected in parallel. The charging concept of the charging circuit in accordance with the invention can be adjusted in this manner for supplying energy from a multi-phase energy supply network or another multi-phase energy source.

In accordance with a further aspect, the present invention provides a charging device having a plurality of charging circuits in accordance with the invention, an electrical energy storage device that is electrically coupled to the DC voltage connections of the charging circuits; and a plurality of further inductances, wherein each further inductance is electrically coupled to a phase of a multi-phase AC voltage. The input connections of the individual charging circuits are also electrically coupled to one another and thus connected in parallel. It is also possible in this manner in order to supply energy in a multi-phase manner, by way of example from a three-phase supply, to transfer energy in an inductive manner, wherein separate secondary coils (receiving coils) are not required.

In accordance with a further aspect, the present invention comprises an electrical drive system having a charging circuit in accordance with the invention, an electrical energy storage device that is electrically coupled to the DC voltage connection of the charging circuit; and an electric machine that comprises a phase connection that is electrically coupled to the charging switch of the charging circuit.

In accordance with a further aspect, the present invention provides a motor vehicle, in particular an air-borne, water-borne or land vehicle, having an electrical drive system in accordance with the invention.

Further advantages and embodiments of the present invention are evident in the description hereinunder with reference to the attached drawings.

DETAILED DESCRIPTION

Figure 1:
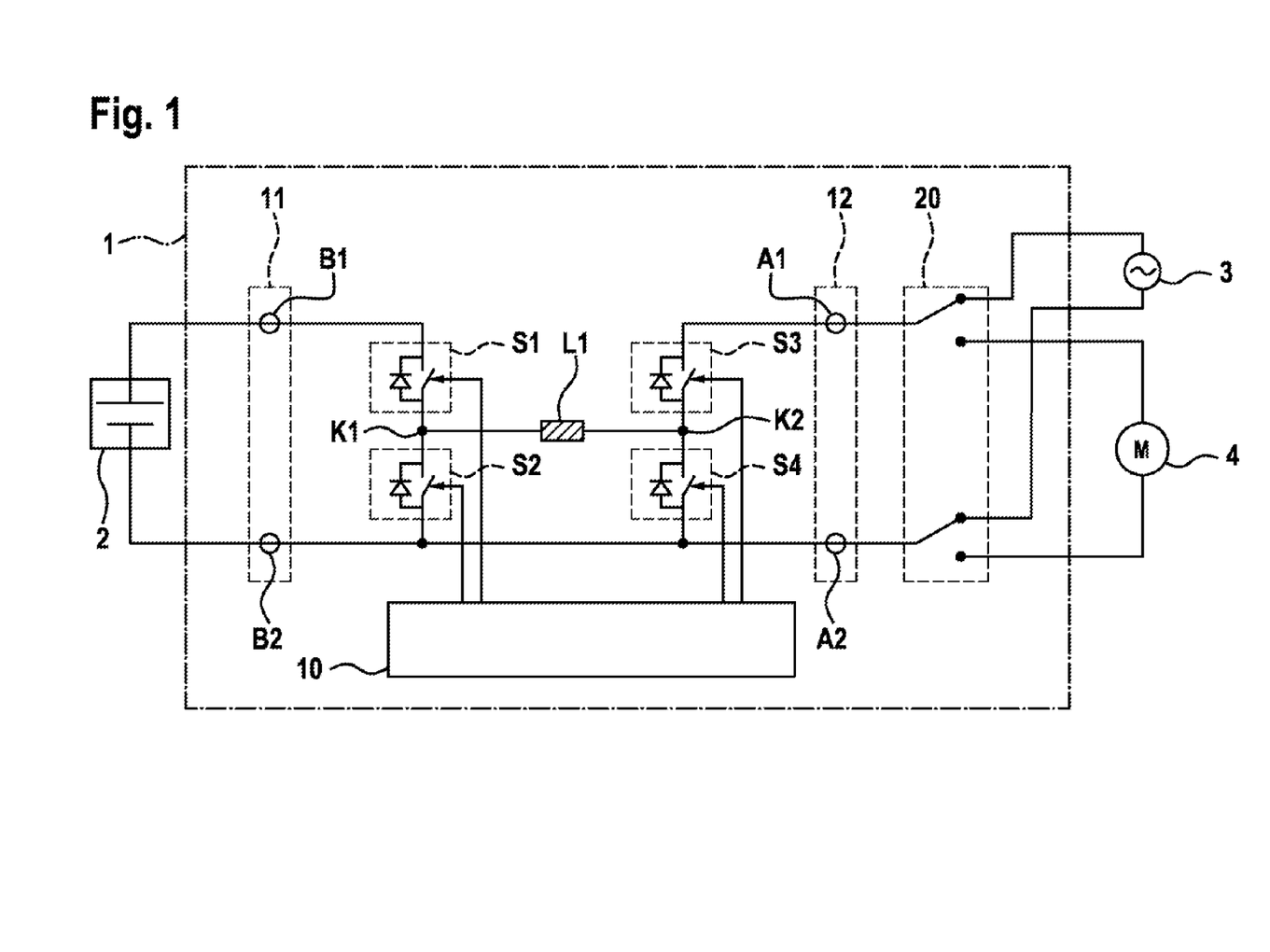
FIG. 1 illustrates a schematic view of a charging circuit for the conductive charging method in accordance with one embodiment.

FIG. 1 illustrates a schematic view of a charging circuit 1. An electrical energy storage device 2 is arranged at a DC voltage connection 11 having the two connection elements B1 and B2. By way of example, it is possible in the case of this electrical energy storage device 2 that the battery is in particular a traction battery of an electric vehicle or hybrid vehicle. Furthermore, other optional electrical energy storage devices are also possible at the DC voltage connection 11 of the charging circuit 1. Moreover, the charging circuit 1 comprises an AC voltage connection 12 having the two connection elements A1 and A2. A first switching element S1 of the charging circuit 1 is arranged between the first connection element B1 and a first junction K1. A second switching element S2 is arranged between the first junction K1 and the second connection element B2 of the DC voltage connection 11. A third switching element S3 is arranged between a first connection element A1 of the AC voltage connection 12 and a second junction K2. A fourth switching element S4 is arranged between the second junction K2 and a further connection element A2 of the AC voltage connection 12. A first inductance L1 is arranged between the first junction K1 and the second junction K2. Furthermore, the second connection element B2 of the DC voltage connection 11 and the other connection element A2 of the AC voltage connection 12 are electrically connected to one another. It is preferred that this electrical connection between the second connection element B2 of the DC voltage connect 11 and the further connection element A2 of the AC voltage connection 12 is connected to a reference potential. The two connection elements A1 and A2 of the AC voltage connection 12 are connected to a charging switch 20. The charging switch 20 is furthermore connected to an electrical energy source 3 and an electrical consumer, by way of example an electric motor 4. The charging switch 20 comprises two switching elements, wherein each of the two switching elements of one of the two connection elements A1 and A2 of the AC voltage connection 12 can be electrically connected either to the voltage source 3 or to the electric motor 4. The two switching elements of the charging switch 20 are coupled to one another so that always either two connections A1 and A2 of the AC voltage connection 12 are connected to the electrical voltage source 3 or the electric motor 4.

It is preferred that the four switching elements S1 to S4 of the charging circuit 1 are semi-conductor switching elements. A diode can be connected in parallel to each of the semi-conductor switching elements. The semi-conductor switching elements of the switching element S1 to S4 can be by way of example thyristors, bi-polar transistors having an isolating gate (IGBT) or MOSFET. Silcon carbide switches (SiC) or super-junction MOSFET are in particular suitable for high switching frequencies that at switching frequencies of more than 20 kHz comprise only very small switching losses.

The switching elements S1 to S4 are controlled by means of a control device 10. The control device 10 is embodied so as to receive control signals and/or desired values for charging the electrical energy storage device 2 or for operating the electric machine 4. On the basis of these control signals and/or desired values, the control device 10 outputs switching signals to the switching elements S1 to S4 in order to open or close the corresponding switching elements S1 to S4. The control signals or desired values can be provided to the control device 10 by way of analogue or digital signals. By way of example, the corresponding control signals or desired values can also be transmitted by way of a bus system and received by the control device 10. Furthermore, the control device 10 can also receive measured values regarding the voltage at the DC voltage connection 11 and/or at the AC voltage connection 12.

Depending upon how the switching elements S1 to S4 in the charging circuit 10 are controlled, it is consequently possible to achieve different operating modes. In a charging mode, the charging circuit 1 functions as a combined rectifier and buck-boost converter. For this purpose, the AC voltage connection 12 of the charging circuit 1 is initially connected by way of the charging switch 20 to the voltage source 3 and simultaneously an electrical connection between the AC voltage connection 12 and the electric machine 4 is separated. In this charging mode, an electrical voltage, preferably an AC voltage, is provided by the voltage source 3 at the AC voltage connection 12 of the charging circuit 1. The magnitude of the provided AC voltage can vary and can be greater than or less than the required DC voltage for charging the electrical energy storage device 2 that is to be provided at the DC voltage connection 12.

If the amplitude or the maximum value of the voltage at the DC voltage connection 12 is less than the DC voltage that is required to charge the electrical energy storage device 2, then the charging circuit 1 operates in an operating mode as a combined rectifier and boost converter. In this case, the third switching element S3 is permanently closed and the fourth switching element S4 is permanently open. The first switching element S1 operates as an active rectifier and allows the flow only in one direction. The second switching element S2 is switched with a predetermined switching frequency. U2 denotes the maximum value for the AC voltage at the AC voltage connection 12 and U1 denotes the value of the DC voltage that is to be supplied to the electrical energy storage device 2 and furthermore T denotes the period duration of the clock signal with which the second switching element S2 is controlled and $t_{ein}$ denotes the switch-on moment within the period duration, thus producing the following formula:

$$U1/U2=T/(T-t_{ein}).$$

If the maximum value or the amplitude of the voltage U2 provided by the voltage source 3 at the AC voltage connection is greater than the voltage U1 with which the electrical energy storage device 2 is to be charged, then the charging circuit 1 operates as a combined rectifier and buck converter. For this purpose, the first switching element S1 is permanently closed and the second switching element S2 is permanently open. The fourth switching element S4 operates as an active rectifier and allows the flow only in one direction, whereas the third switching element S3 is switched with the predetermined switching frequency (f=1/T). In this case, the voltage ratios develop in accordance with the following formula:

$$U1/U2=t_{ein}/T.$$

Furthermore, the charging circuit 1 also renders possible a reverse operation, wherein the voltage from the electrical energy storage device 2 is converted into a voltage that can be fed into an energy supply network or can be used to control an electric machine 4. In so doing, the charging circuit 1 can operate in a further operating mode as a combined boost converter-inverter. The DC voltage of the electrical energy source 2 is increased and simultaneously converted into a voltage that is suitable for controlling the electric machine 4 or for feeding into an electrical energy supply network. For this purpose, the first switching element S1 is controlled by means of the control device 10 in such a manner that it is permanently closed. Moreover, the second switching element S2 is permanently open. The third switching element S3 is controlled as an active rectifier so that the current flows only in one direction. The fourth switching element S4 is finally controlled with a predetermined switching frequency (f=1/T). In so doing, the principle of the pulse width modulation is used to select a pulse duty factor with which the voltage at the AC voltage connection 12 can be set. This produces the following relationship:

$$U2/U1=T/(T-t_{ein}).$$

In an alternative operating mode, the charging circuit 1 operates as a combined buck converter and inverter. The DC voltage of the electrical energy storage device 2 that is applied at the DC voltage connection 11 is thus reduced and simultaneously converted into a voltage that is suitable for the purpose of controlling the electric machine 4, or for feeding into the energy supply network. In so doing, in the buck converter operation the maximum value, in other words the amplitude of the voltage at the AC voltage connection 12 is less than the DC voltage that is applied at the DC voltage connection 11. The third switching element S3 is permanently closed and the fourth switching element S4 is permanently open. The second switching element S2 is controlled as an active rectifier and allows the flow only in one direction. The first switching element S1 is finally controlled with a predetermined switching frequency (f=1/T) in such a manner that the desired output voltage is set at the DC voltage connection 12. The ratio of voltage U2 at the AC voltage connection 12 to the input voltage U1 at the DC voltage connection 11 is as follows:

$$U2/U1 = t_{ein}/T.$$

It is clearly evident from these formulae that in the buck converter mode the voltage U2 can be reduced to 0 volt if $t_{ein}$ moves towards zero.

The switching frequency with which the switching element S1 to S4 can be controlled by means of the control device 10 can be selected in a very broad frequency range. As in the case of conventional inverters, switching frequencies by way of example in the range from up to 10 kHz are possible. Relatively low switching frequencies do however require a relatively large inductance L1 between the first junction K1 and the second junction K2. By virtue of increasing the switching frequency to frequencies above 20 kHz and higher, it is possible to reduce the required inductance L1 accordingly. This leads to a reduction in the required installation space and weight of the charging circuit 1. Furthermore, the use of switching frequencies above the frequency spectrum that is audible for a human being also leads to reduced inference on the acoustics. Modern silicon carbide (SiC) switches are particularly advantageous for use at such high switching frequencies of 20 kHz and more. SiC switches of this type comprise relatively small switching losses even in the case of switching frequencies above 20 kHz. Furthermore, as an alternative, it is also possible to use voltage converters that comprise super-junction-MOSFETs and that likewise comprise only small switching losses in the case of high frequencies.

Figure 2:
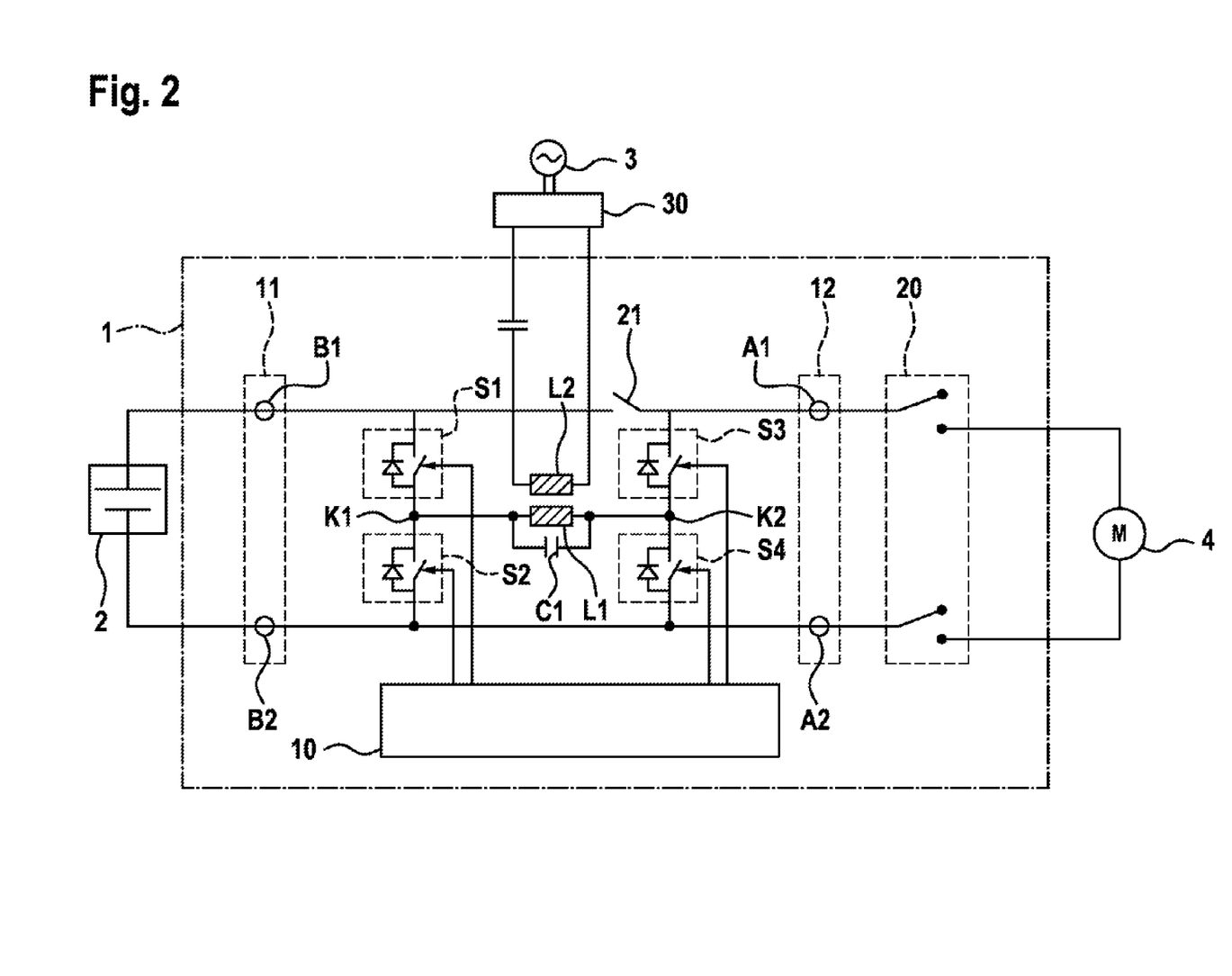
FIG. 2 illustrates a schematic view of a charging circuit for the inductive charging method in accordance with one embodiment.

FIG. 2 illustrates a schematic view of a further embodiment for a charging circuit 1. The charging circuit 1 of this embodiment corresponds to a great extent to the charging circuit in FIG. 1. Furthermore, the first inductance L1 is simultaneously used in this embodied as a transmit/receive coil for an inductive charging system. It is possible in this manner to transfer energy in a transformer-like manner between the first inductance L1 and a further inductance L2. Since typically inductive systems are achieved as resonant oscillating circuits, it is necessary to connect into the charging circuit 1 a capacitor C1 for a capacitive compensation and resonant frequency determination. This capacitor C1 is arranged between the first junction K1 and the second junction K2 in a parallel manner with respect to the first inductance L1.

The further inductance L2 is controlled by a suitable charging circuit 30. In order to charge the electrical energy storage device 2, the charging circuit 30 is supplied with energy from a voltage source 3. The charging circuit 30 converts the voltage that is supplied from the voltage source 3 into a suitable, preferably high frequency, AC voltage and using this high frequency AC voltage excites the further inductance L2. The further inductance L2 subsequently generates an electromagnetic alternating field that couples into the first inductance L1 and in so doing induces a voltage in the first inductance L1.

In order to render it possible to couple the electromagnetic alternating field into the first inductance L1, it is necessary to modify the first inductance L1 for the inductive transfer of energy between the further inductance L2 and the first inductance L1. Whereas for an operation in the driving mode in which electrical energy is converted between the DC voltage connection 11 and the AC voltage connection 12, the first inductance L1 must preferably comprise a closed yoke. However, if the electromagnetic alternating field of the further inductance 2 is coupled into the first inductance L1, then it is necessary to open this yoke so that the magnetic flux of the further inductance L2 can couple into the first inductance. As a consequence, the couple factor between the further inductance L2 and the first inductance L1 is maximized. For this purpose, any mechanical constructions are possible. By way of example, the yoke can be adjusted by virtue of an electric drive according to the desired operating mode. As an alternative, it is also possible to fold back or displace a part of the yoke as soon as the first inductance L1 is arranged above the further inductance L2. For this purpose, any purely mechanical or motor-controlled solutions are possible.

It is also necessary in this configuration for the electrical connection between the AC voltage connection 12 and the electric motor 4 to be separated in the charging mode by means of the charging switch 20. Furthermore, the first connection element B1 of the DC voltage connection 11 is electrically connected to the first connection element A1 of the AC voltage connection 12 by means of an additional switching element 21 so that a rectifier circuit is produced by means of the four switching elements S1 to S4. Furthermore, it is possible to achieve an additional increase in the degree of effectiveness by virtue of actively controlling the switching elements S1 to S4 parallel to the flywheel diodes (active rectification).

Figure 3:
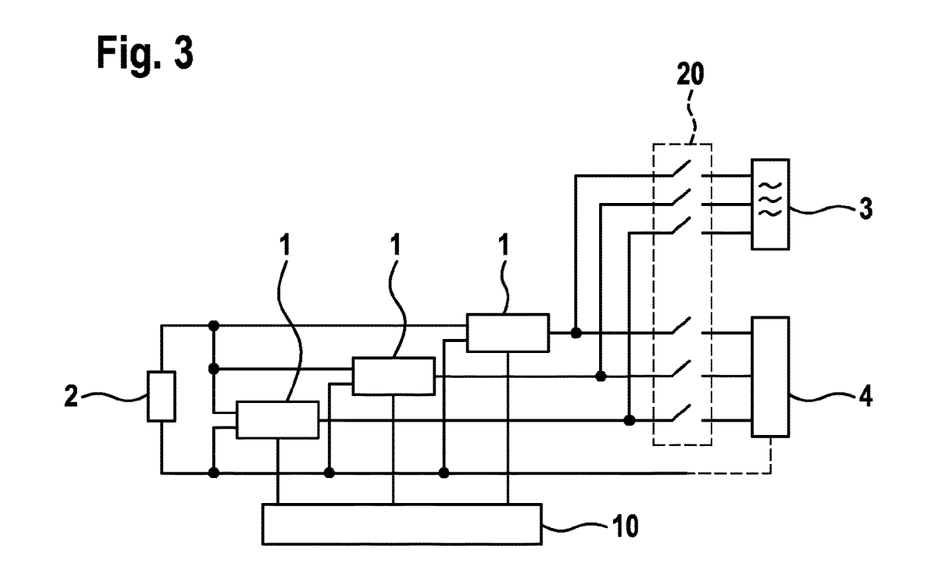
FIG. 3 illustrates a schematic view of a three-phase charging device for the conductive charging method in accordance with one embodiment.

FIG. 3 illustrates a schematic view of a multi-phase charging device. The concept in accordance with the invention can be used for any number of phases and is not limited to the structure illustrated here that has three phases. The charging device in accordance with FIG. 3 comprises for each phase a separate charging circuit 1. The DC voltage connections 11 of the individual charging circuits 1 are coupled to one another and connected in parallel. These mutually coupled DC voltage connections 11 of the charging circuits 1 are connected to an energy storage device 2. Each charging circuit 1 is coupled to a phase of a multi-phase system on the AC voltage side. The charging switch 20 comprises in this exemplary embodiment a suitable number of switching elements so that all phases can either be coupled to the multi-phase energy source 3 or to the phase connections of the multi-phase electric drive 4. Fundamentally, it is also possible that the electric drive 4 comprises more phases that the electrical energy source 3. In this case, where necessary not all charging circuits 1 are coupled to a phase of the electrical voltage source 3.

It is possible for a central and synchronous control of all charging circuits 1 to control all the charging circuits 1 and in particular all the switching elements S1 to S4 of all charging circuits 1 by means of a common control device 10.

Figure 4:
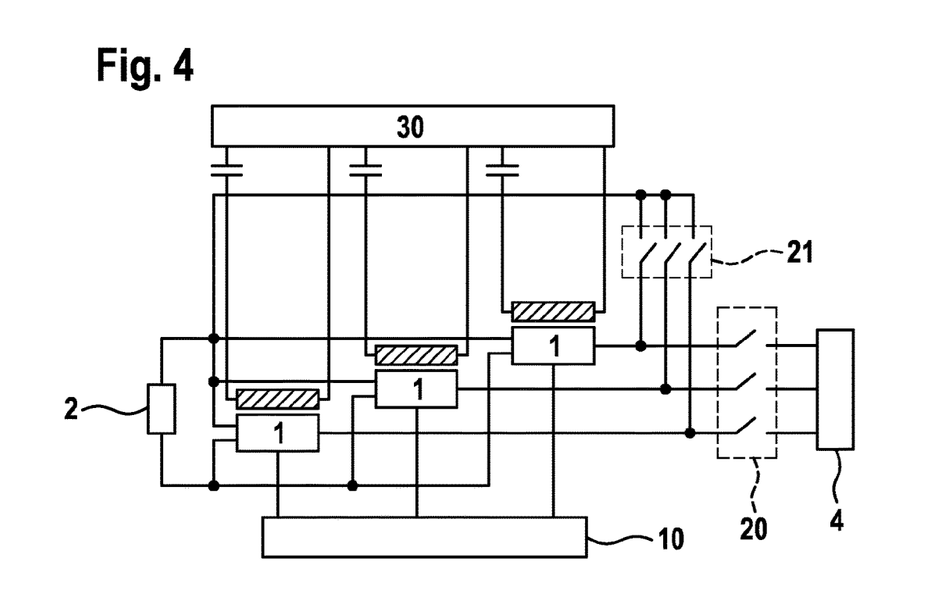
FIG. 4 illustrates a schematic view of a three-phase charging device for the inductive charging method in accordance with one embodiment.

FIG. 4 illustrates a schematic view of a charging device for an inductive charging method with multiple phases. The charging device comprises in this embodiment a separate charging circuit 1 for each phase. In particular, the charging circuit in this embodiment for each phase of the voltage source 3 comprises a separate charging circuit in accordance with FIG. 2. It is also possible in this embodiment to control all charging circuits 1 by means of a central control device 10.

In the case of a multi-phase charging circuit in accordance with the FIG. 3 or 4, the control device 10 can adjust the number of used phases of the voltage source 3 in particular in dependence upon the electrical current with which the electrical energy storage device 2 is to be charged. It is possible by way of example in dependence upon the charging time period available and/or the charge state of the electrical energy storage device 2 to vary the number of the used phases of the voltage source 3. It is possible in this manner by virtue of reducing the number of used phases of the voltage source 3 to operate the active charging circuits in an efficient working range even in the case of a low electrical charging capacity.

In the previously described exemplary embodiments, an individual charging circuit 1 is described both in the single-phase and also in the multi-phase operation in each case for each phase. Furthermore, it is also possible to connect multiple charging circuits 1 in parallel, and thereby to expand the capacity range. If multiple charging circuits 1 are connected in parallel in one phase, then it is also possible in dependence upon the desired charging capacity to vary the number of controlled charging circuits. By way of example, it is possible in the case of a desired high charging capacity to control in a parallel manner all available charging circuits 1. If, on the other, the electrical energy storage device 2 is only to be charged with a lower magnitude of energy or if only a magnitude of energy is to be drawn off from the electrical energy storage device 2, then it is also possible in the case of multiple parallel-connected charging circuits 1 to control only a part of these charging circuits 1, or where necessary to also control only an individual charging circuit 1. In this manner, the controlled charging circuits 1 can always be operated in an efficient working range and as a consequence the losses in the active charging circuits are minimized.

Figure 5:
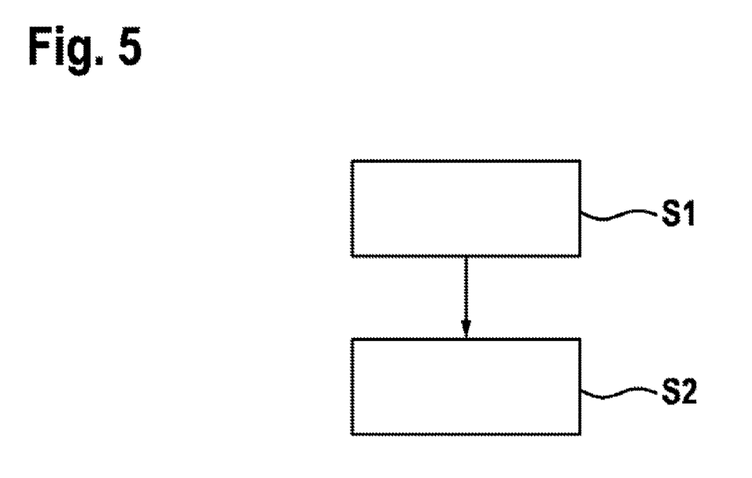
FIG. 5 illustrates a schematic view of a flow diagram such as forms the basis for a method in accordance with one embodiment.

FIG. 5 illustrates a schematic illustration of a flow diagram for a method for operating a charging circuit in accordance with the invention. If the charging circuit 1 is to be operated in a drive mode, then the charging circuit 1 is coupled to an electric machine 4 in step S1. In order to charge the electrical energy storage device 2, or to feed electrical energy from the electrical energy storage device 2 into an energy supply network, the charging circuit 1 is on the other hand operated in a charging mode. For this purpose, the electrical connection between the electric machine 4 and the charging circuit 1 is separated in step S2.

To summarize, the present invention relates to a charging circuit for an electrical energy storage device. Common components are used for charging and discharging the electrical energy storage device. For this purpose, a charging circuit is proposed that comprises boost and buck converter functionalities and combines these with rectifier or inverter functionalities. It is rendered possible in this manner to achieve a switching arrangement that with a small number of components renders possible a flexible circuit construction.

The invention claimed is:

1. A charging circuit (1) for an electrical energy storage device (2), the charging circuit comprising:
   a DC voltage connection (11) that comprises a first connection element (B1) and a second connection element (B2) and that is connected to an electrical energy storage device (2);
   an AC voltage connection (12) that comprises a third connection element (A1) and a fourth connection element (A2);
   a first switching element (S1) that is arranged between the first connection element (B1) and a first junction (K1);
   a second switching element (S2) that is arranged between the first junction (K1) and the second connection element (B2);
   a third switching element (S3) that is arranged between the third connection element (A1) and a second junction (K2);
   a fourth switching element (S4) that is arranged between the second junction (K2) and the further connection element (A2);
   a first inductance (L1) that is arranged between the first junction (K1) and the second junction (K2); and
   a charging switch (20) that is configured, in a charging mode, to electrically separate the AC voltage connection (12) from an electric machine (4) and, in a driving mode, to electrically couple the AC voltage connection (12) to the electric machine (4).

2. The charging circuit (1) as claimed in claim 1, wherein the charging switch (20) is configured, in the charging mode, to connect the AC voltage connection (12) to an AC voltage source (3).

3. The charging circuit (1) as claimed in claim 1, wherein the first inductance (L1) can be coupled to a further inductance (L2).

4. The charging circuit (1) as claimed in claim 1, having a control circuit (10) that is embodied so as to control the first, second, third and fourth switching element (S1, S2, S3, S4) with a predetermined switching frequency.

5. The charging circuit (1) as claimed in claim 1, wherein the predetermined switching frequency is greater than 20 kHz.

6. A charging device, comprising:
   a plurality of charging circuits (1), each of the plurality of charging circuits (1) including
      a DC voltage connection (11) that comprises a first connection element (B1) and a second connection element (B2) and that is connected to an electrical energy storage device (2);
      an AC voltage connection (12) that comprises a third connection element (A1) and a fourth connection element (A2);
      a first switching element (S1) that is arranged between the first connection element (B1) and a first junction (K1);
      a second switching element (S2) that is arranged between the first junction (K1) and the second connection element (B2);
      a third switching element (S3) that is arranged between the third connection element (A1) and a second junction (K2);
      a fourth switching element (S4) that is arranged between the second junction (K2) and the further connection element (A2);
      a first inductance (L1) that is arranged between the first junction (K1) and the second junction (K2); and
      a charging switch (20) that is configured, in a charging mode, to electrically separate the AC voltage connection (12) from an electric machine (4) and, in a driving mode, to electrically couple the AC voltage connection (12) to the electric machine (4);
   an electrical energy storage device (2) that is electrically coupled to the DC voltage connections (11) of the plurality of charging circuits (1);

a multi-phase AC voltage source (3), wherein each phase of the AC voltage source (3) is electrically coupled to an AC voltage connection (12) of a charging circuit (1).

7. A charging device, having:
a plurality of charging circuits (1), each of the plurality of charging circuits (1) including
   a DC voltage connection (11) that comprises a first connection element (B1) and a second connection element (B2) and that is connected to an electrical energy storage device (2);
   an AC voltage connection (12) that comprises a third connection element (A1) and a fourth connection element (A2);
   a first switching element (S1) that is arranged between the first connection element (B1) and a first junction (K1);
   a second switching element (S2) that is arranged between the first junction (K1) and the second connection element (B2);
   a third switching element (S3) that is arranged between the third connection element (A1) and a second junction (K2);
   a fourth switching element (S4) that is arranged between the second junction (K2) and the further connection element (A2);
   a first inductance (L1) that is arranged between the first junction (K1) and the second junction (K2); and
   a charging switch (20) that is configured, in a charging mode, to electrically separate the AC voltage connection (12) from an electric machine (4) and, in a driving mode, to electrically couple the AC voltage connection (12) to the electric machine (4);
an electrical energy storage device (2) that is electrically coupled to the DC voltage connections (11) of the plurality of charging circuits (1);
a plurality of further inductances (L2), wherein each further inductance (L2) is electrically coupled to a phase of a multi-phase AC voltage source (3).

8. An electrical drive system, having:
a charging circuit (1) including
   a DC voltage connection (11) that comprises a first connection element (B1) and a second connection element (B2) and that is connected to an electrical energy storage device (2);
   an AC voltage connection (12) that comprises a third connection element (A1) and a fourth connection element (A2);
   a first switching element (S1) that is arranged between the first connection element (B1) and a first junction (K1);
   a second switching element (S2) that is arranged between the first junction (K1) and the second connection element (B2);
   a third switching element (S3) that is arranged between the third connection element (A1) and a second junction (K2);
   a fourth switching element (S4) that is arranged between the second junction (K2) and the further connection element (A2);
   a first inductance (L1) that is arranged between the first junction (K1) and the second junction (K2); and
   a charging switch (20) that is configured, in a charging mode, to electrically separate the AC voltage connection (12) from an electric machine (4) and, in a driving mode, to electrically couple the AC voltage connection (12) to the electric machine (4);
an electrical energy storage device (2) that is electrically coupled to the DC voltage connection (11) of the charging circuit (1); and
the electric machine (4) that comprises a phase connection is electrically coupled to the charging switch (20) of the charging circuit (1).

9. A motor vehicle having an electrical drive system comprising
a charging circuit (1) including
   a DC voltage connection (11) that comprises a first connection element (B1) and a second connection element (B2) and that is connected to an electrical energy storage device (2);
   an AC voltage connection (12) that comprises a third connection element (A1) and a fourth connection element (A2);
   a first switching element (S1) that is arranged between the first connection element (B1) and a first junction (K1);
   a second switching element (S2) that is arranged between the first junction (K1) and the second connection element (B2);
   a third switching element (S3) that is arranged between the third connection element (A1) and a second junction (K2);
   a fourth switching element (S4) that is arranged between the second junction (K2) and the further connection element (A2);
   a first inductance (L1) that is arranged between the first junction (K1) and the second junction (K2); and
   a charging switch (20) that is configured, in a charging mode, to electrically separate the AC voltage connection (12) from an electric machine (4) and, in a driving mode, to electrically couple the AC voltage connection (12) to the electric machine (4);
an electrical energy storage device (2) that is electrically coupled to the DC voltage connection (11) of the charging circuit (1); and
the electric machine (4) that comprises a phase connection is electrically coupled to the charging switch (20) of the charging circuit (1).

10. A method for operating a charging circuit (1) that includes a first connection element (B1) and a second connection element (B2) and that is connected to an electrical energy storage device (2); an AC voltage connection (12) that comprises a third connection element (A1) and a fourth connection element (A2); a first switching element (S1) that is arranged between the first connection element (B1) and a first junction (K1); a second switching element (S2) that is arranged between the first junction (K1) and the second connection element (B2); a third switching element (S3) that is arranged between the third connection element (A1) and a second junction (K2); a fourth switching element (S4) that is arranged between the second junction (K2) and the further connection element (A2); a first inductance (L1) that is arranged between the first junction (K1) and the second junction (K2); and a charging switch (20) that is configured, in a charging mode, to electrically separate the AC voltage connection (12) from an electric machine (4) and, in a driving mode, to electrically couple the AC voltage connection (12) to the electric machine (4), the method comprising:
   electrically coupling (S1) the electric machine (4) to the charging circuit (1) in a driving mode; and electrically separating (S2) the electric machine (4) from the charging circuit (1) in a charging mode.

* * * * *